(12) United States Patent
Archer et al.

(10) Patent No.: US 8,140,704 B2
(45) Date of Patent: Mar. 20, 2012

(54) PACING NETWORK TRAFFIC AMONG A PLURALITY OF COMPUTE NODES CONNECTED USING A DATA COMMUNICATIONS NETWORK

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Busniess Machines Corporation, Armonk, NY (US)

( * ) Notice: Subject to any disclaimer, the term of this patent is extended or adjusted under 35 U.S.C. 154(b) by 215 days.

(21) Appl. No.: 12/166,748

(22) Filed: Jul. 2, 2008

(65) Prior Publication Data

US 2010/0005189 A1 Jan. 7, 2010

(51) Int. Cl.
*G06F 15/16* (2006.01)
*H04L 1/00* (2006.01)
(52) U.S. Cl. ........ 709/235; 709/232; 709/233; 709/234; 370/229; 710/29
(58) Field of Classification Search .......... 709/232–235; 710/29; 370/229
See application file for complete search history.

(56) References Cited

U.S. PATENT DOCUMENTS

| | | | |
|---|---|---|---|
| 5,050,162 A | | 9/1991 | Golestani |
| 5,063,562 A | * | 11/1991 | Barzilai et al. ................. 370/231 |
| 5,095,444 A | * | 3/1992 | Motles ........................... 709/224 |
| 5,218,676 A | | 6/1993 | Ben-Ayed et al. |
| 5,347,450 A | | 9/1994 | Nugent |
| 5,491,691 A | * | 2/1996 | Shtayer et al. ............ 370/395.42 |
| 5,835,482 A | | 11/1998 | Allen |
| 5,859,981 A | | 1/1999 | Levin et al. |
| 5,862,381 A | | 1/1999 | Advani et al. |
| 5,912,893 A | | 6/1999 | Rolfe et al. |
| 5,918,020 A | * | 6/1999 | Blackard et al. ............... 709/228 |
| 5,933,425 A | | 8/1999 | Iwata |
| 5,937,201 A | | 8/1999 | Matsushita et al. |
| 5,953,336 A | * | 9/1999 | Moore et al. ............. 370/395.43 |
| 5,982,771 A | * | 11/1999 | Caldara et al. ................ 370/389 |
| 5,995,503 A | | 11/1999 | Crawley et al. |
| 6,057,839 A | | 5/2000 | Advani et al. |
| 6,115,357 A | * | 9/2000 | Packer et al. .................. 370/231 |
| 6,118,777 A | * | 9/2000 | Sylvain ......................... 370/351 |
| 6,126,331 A | | 10/2000 | Komatsu et al. |

(Continued)

OTHER PUBLICATIONS

University of Minnesota Super Computing Institute. 2009. Derived Data Types with MPI.

(Continued)

*Primary Examiner* — Alina N. Boutah
(74) *Attorney, Agent, or Firm* — Biggers & Ohanian, LLP (57) ABSTRACT

Methods, apparatus, and products are disclosed for pacing network traffic among a plurality of compute nodes connected using a data communications network. The network has a plurality of network regions, and the plurality of compute nodes are distributed among these network regions. Pacing network traffic among a plurality of compute nodes connected using a data communications network includes: identifying, by a compute node for each region of the network, a roundtrip time delay for communicating with at least one of the compute nodes in that region; determining, by the compute node for each region, a pacing algorithm for that region in dependence upon the roundtrip time delay for that region; and transmitting, by the compute node, network packets to at least one of the compute nodes in at least one of the network regions in dependence upon the pacing algorithm for that region.

15 Claims, 7 Drawing Sheets

U.S. PATENT DOCUMENTS

| | | | | |
|---|---|---|---|---|
| 6,167,490 | A | 12/2000 | Levy et al. | |
| 6,253,372 | B1 | 6/2001 | Komatsu et al. | |
| 6,336,143 | B1* | 1/2002 | Diedrich et al. | 709/231 |
| 6,438,702 | B1* | 8/2002 | Hodge | 713/400 |
| 6,490,566 | B1 | 12/2002 | Schmidt | |
| 6,600,721 | B2* | 7/2003 | Edholm | 370/232 |
| 6,601,098 | B1* | 7/2003 | Case et al. | 709/224 |
| 6,687,247 | B1* | 2/2004 | Wilford et al. | 370/392 |
| 6,742,044 | B1* | 5/2004 | Aviani et al. | 709/235 |
| 6,748,413 | B1 | 6/2004 | Bournas | |
| 6,775,703 | B1 | 8/2004 | Burns et al. | |
| 6,839,768 | B2* | 1/2005 | Ma et al. | 709/235 |
| 6,839,829 | B1* | 1/2005 | Daruwalla et al. | 712/28 |
| 6,894,974 | B1* | 5/2005 | Aweya et al. | 370/230.1 |
| 6,901,052 | B2 | 5/2005 | Buskirk et al. | |
| 6,990,529 | B2* | 1/2006 | Yang et al. | 709/235 |
| 7,032,224 | B2 | 4/2006 | Kadakia et al. | |
| 7,286,471 | B2* | 10/2007 | Kloth et al. | 370/230 |
| 7,466,652 | B2* | 12/2008 | Lau et al. | 370/230.1 |
| 7,509,244 | B1 | 3/2009 | Shakeri et al. | |
| 7,527,558 | B2* | 5/2009 | Lavoie et al. | 463/42 |
| 7,539,209 | B2* | 5/2009 | Pelley | 370/468 |
| 7,684,332 | B2* | 3/2010 | Ray et al. | 370/235 |
| 2002/0065930 | A1* | 5/2002 | Rhodes | 709/232 |
| 2003/0021287 | A1* | 1/2003 | Lee et al. | 370/442 |
| 2004/0001508 | A1 | 1/2004 | Zheng et al. | |
| 2004/0111398 | A1* | 6/2004 | England et al. | 707/3 |
| 2004/0246897 | A1* | 12/2004 | Ma et al. | 370/230 |
| 2005/0053034 | A1* | 3/2005 | Chiueh | 370/331 |
| 2006/0002424 | A1 | 1/2006 | Gadde | |
| 2006/0018283 | A1* | 1/2006 | Lewis et al. | 370/331 |
| 2006/0203739 | A1* | 9/2006 | Padmanabhan et al. | 370/252 |
| 2007/0014316 | A1* | 1/2007 | Ryu et al. | 370/546 |
| 2007/0121511 | A1* | 5/2007 | Morandin | 370/235 |
| 2007/0179760 | A1 | 8/2007 | Smith | |
| 2008/0016249 | A1 | 1/2008 | Ellis et al. | |
| 2008/0109569 | A1 | 5/2008 | Leonard et al. | |
| 2008/0240115 | A1* | 10/2008 | Briscoe et al. | 370/400 |
| 2009/0003344 | A1 | 1/2009 | Kumar | |
| 2009/0006808 | A1* | 1/2009 | Blumrich et al. | 712/12 |
| 2009/0196282 | A1* | 8/2009 | Fellman et al. | 370/352 |
| 2010/0017492 | A1* | 1/2010 | Reistad | 709/206 |
| 2010/0274872 | A1* | 10/2010 | Harrang et al. | 709/217 |

OTHER PUBLICATIONS

William Saphir, Message Buffering and It's Effect on the Communications Performance on Parallel Computers. Apr. 1994.
University of Minnesota Super Computing Institute. 2009 MPI Performance Topics.
Final Office Action, U.S. Appl. No. 11/865,981, Jul. 22, 2011.
Nenad Stankovic Kang Zhang, Visual Programming for Message-Passing Systems (1999), International Journal of Software Engineering and Knowledge Engineering.
Matthew J. Sottile, Vaddadi P. Chandu, David A. Bader, Performance analysis of parallel programs via message-passing graph traversal, College of Computing, Georgia Institute of Technology, Feb. 25, 2006.
"MPI-2: Extensions to the Message-Passing Interface," Forum, Nov. 15, 2003.
Office Action, U.S. Appl. No. 11/946,934, Nov. 24, 2010.
Office Action, U.S. Appl. No. 11/924,934, Aug. 19, 2010.
Notice of Allowance, U.S. Appl. No. 11/764,282, Dec. 10, 2010.
Office Action, U.S. Appl. No. 11/832,192, Oct. 29, 2010.
Office Action, U.S. Appl. No. 12/166,748, May 27, 2010.
Office Action, U.S. Appl. No. 12/166,748, Aug. 25, 2010.
Notice of Allowance, U.S. Appl. No. 12/180,963, Oct. 20, 2010.
Final Office Action, U.S. Appl. No. 12/166,748, Mar. 7, 2011.
Final Office Action, U.S. Appl. No. 11/832,192, Apr. 13, 2011.
Office Action, U.S. Appl. No. 11/764,333, Apr. 13, 2011.
Final Office Action, U.S. Appl. No. 11/924,934, Feb. 24, 2011.
Notice of Allowance, U.S. Appl. No. 11/946,136, Mar. 4, 2011.
Office Action, U.S. Appl. No. 11/865,921, Feb. 2, 2011.
Randy L. Ribler et al., "The Autopilot performance-directed adaptive control system," Future Generations Computer Systems, Elsevier Science Publications, Amsterdam, NL, vol. 18, No. 1, Sep. 1, 2001, pp. 175-187.
Yan Zhang et al., "Automatic Performance Tuning for J2EE Application Server Systems," Lecture Notes in Computer Science, vol. 3806, 2005, pp. 520-527.
I-Hsin Chung et al., "Automated Cluster-Based Web Service Performance Tuning," High Performance Distributed Computing, 2004, Proceedings of the 13th IEEE International Symposium on Honolulu, HI, USA, Jun. 4-6, 2004, Piscataway, NJ, USA, pp. 36-44.
Anna Hondroudakis et al., "An Empirically Derived Framework for Classifying Parallel Program Performance Tuning Problems," Proceedings of the Sigmetrics Symposium on Parallel and Distributed Tools, SPDT 1998, Welches, or, Aug. 3-4, 1998. Sigmetrics Symposium on Parallel and Distributed Tools, New York, NY, US, ACM, vol. Symp 2, Aug. 3, 1998, pp. 112-123.
A. Gara et al., "Overview of the Blue Gene/L system architecture," IBM Journal of Research & Development, vol. 49, Nos. 2/3, Mar./May 2005, pp. 195-211.
N. R. Adiga et al., "Blue Gene/L torus interconnection network." IBM Journal of Research & Development, vol. 49, Nos. 2/3, Mar./May 2005, pp. 265-276.
Mike Barnett et al., "Broadcasting on Meshes with Worm-Hole Routing," Second Revised Version, 1995.

* cited by examiner

PACING NETWORK TRAFFIC AMONG A PLURALITY OF COMPUTE NODES CONNECTED USING A DATA COMMUNICATIONS NETWORK

BACKGROUND OF THE INVENTION

1. Field of the Invention

The field of the invention is data processing, or, more specifically, methods, apparatus, and products for pacing network traffic among a plurality of compute nodes connected using a data communications network.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are organized in a binary tree arrangement: each node has a parent and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, such as, for example, an allgather, allreduce, broadcast, scatter, and so on.

When large amounts of network traffic pass between two nodes in two different sections of such networks, the links between those nodes often become congested, thereby inhibiting the efficient flow of network traffic. To decongest those links, the compute nodes may transmit a certain amount of data and then wait for an acknowledgement from the compute node receiving the data before transmitting any more data. Although waiting for an acknowledgement from the recipient node may operate to reduce network traffic between those two compute nodes, this waiting also penalizes communications between the transmitting node and the other compute nodes in the network because the transmitting node must wait for an acknowledgement from the last receiving compute node before sending data to any of the other compute nodes. The links between the sending node and the other compute nodes in the network, however, may not be congested. Therefore, the current manner of alleviating network congestion often wastes time and valuable computing resources.

SUMMARY OF THE INVENTION

Methods, apparatus, and products are disclosed for pacing network traffic among a plurality of compute nodes connected using a data communications network. The network has a plurality of network regions, and the plurality of compute nodes are distributed among these network regions. Pacing network traffic among a plurality of compute nodes connected using a data communications network includes: identifying, by a compute node for each region of the network, a roundtrip time delay for communicating with at least one of the compute nodes in that region; determining, by that compute node for each region, a pacing algorithm for that region in dependence upon the roundtrip time delay for that region; and transmitting, by the compute node, network packets to at least one of the compute nodes in at least one of the network regions in dependence upon the pacing algorithm for that region.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
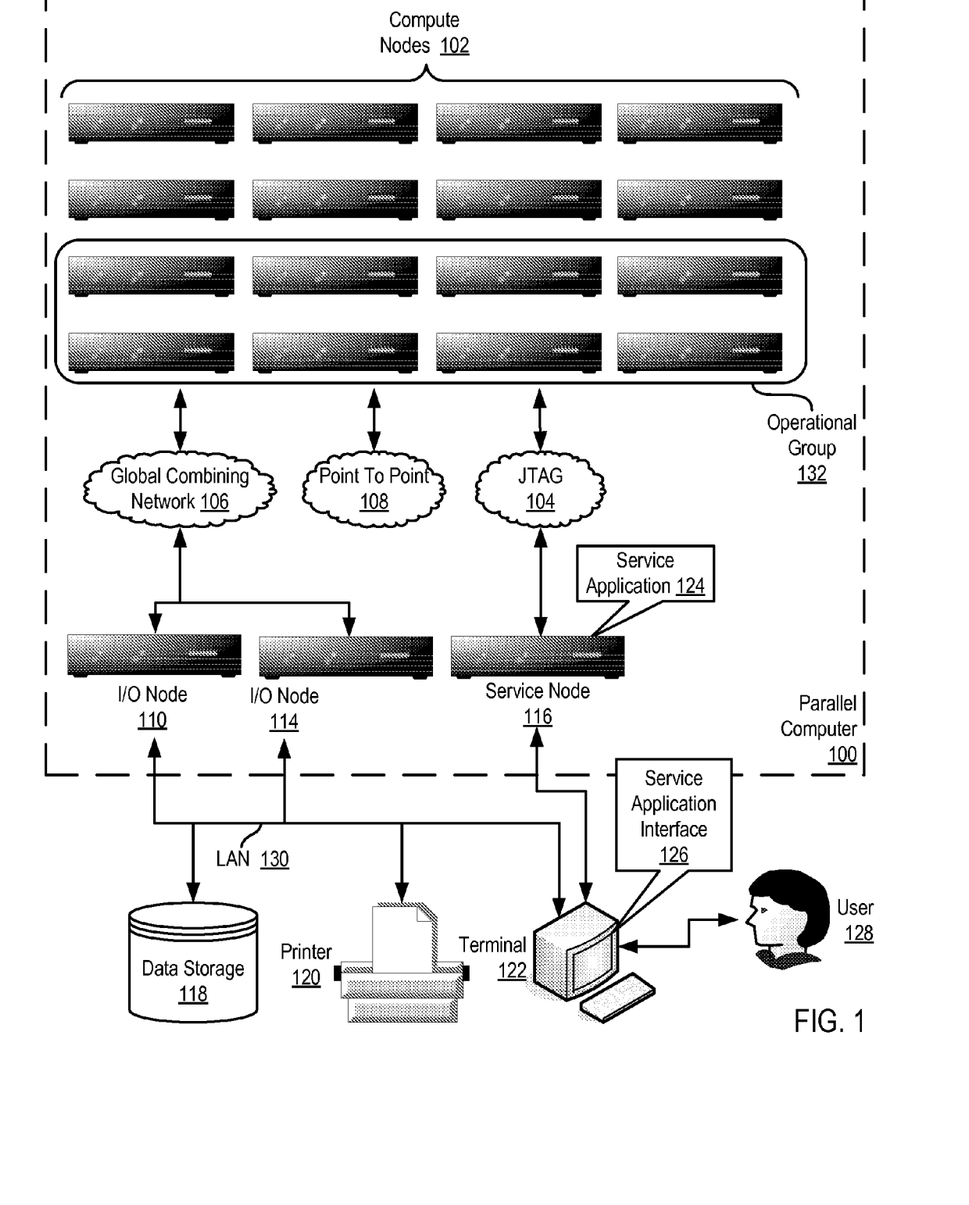
FIG. 1 illustrates an exemplary system for pacing network traffic among a plurality of compute nodes connected using a data communications network according to embodiments of the present invention.

Exemplary methods, apparatus, and computer program products for pacing network traffic among a plurality of compute nodes connected using a data communications network according to embodiments of the present invention are described with reference to the accompanying drawings, beginning with FIG. 1. FIG. 1 illustrates an exemplary system for pacing network traffic among a plurality of compute nodes connected using a data communications network according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102) that execute an application. The application is a set of computer program instructions that provide user-level data processing.

Each compute node (102) of FIG. 1 may include a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode or parallel processing mode. The mode in which the compute nodes operate is generally set during the node's boot processes and does not change until the node reboots.

In serial processing mode, often referred to a 'virtual node mode,' the processors of a compute node operate independently of one another, and each processor has access to a partition of the node's total memory that is exclusively dedicated to that processor. For example, if a compute node has four processors and two Gigabytes (GB) of RAM, when operating in serial processing mode, each processor may process a thread independently of the other processors on that node, and each processor may access a 512 Megabyte (MB) portion of that node's total 2 GB of RAM.

In parallel processing mode, often referred to as 'symmetric multi-processing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount * N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for pacing network traffic among a plurality of compute nodes connected using a data communications network (108) according to embodiments of the present invention. The network (108) of FIG. 1 has a plurality of network regions, and the plurality of compute nodes (102) are distributed among these network regions. A network region is a group of adjacent compute nodes and the corresponding network infrastructure that enables communications among the nodes in the group. The compute nodes are 'adjacent' in the sense that each node in the group is adjacent in network topology to at least one other node in the group. Two compute nodes are adjacent when the compute nodes are capable of communicating directly through a network link without any intervening compute nodes in the data communication path. In the example of FIG. 1, the network regions may be specified by the nodes included in each region, and the boundary between network regions may be determined by a system administrator.

The system of FIG. 1 operates generally for pacing network traffic among a plurality of compute nodes connected using a data communications network according to embodiments of the present invention as follows: A compute node identifies, for each region of the network, a roundtrip time delay for communicating with at least one of the compute nodes in that region. The compute node then determines a pacing algorithm for that region in dependence upon the roundtrip time delay for that region. The compute node then transmits network packets to at least one of the compute nodes in at least one of the network regions in dependence upon the pacing algorithm for that region.

A pacing algorithm in this specification refers to the manner in which a compute node limits data transmissions to the compute nodes of a particular network region. For example, a pacing algorithm may specify allowing a transmission time delay to elapse between transmissions of a particular number of the network packets. Readers will note that a particular pacing algorithm does not apply to all of the compute nodes in the network. Rather, each pacing algorithm applies only to a specific group of compute nodes in a specific network region. That is not to say, however, that two pacing algorithms that apply to the nodes in two different network regions could not specify the same manner of limiting data transmissions to the compute nodes in the two respective regions. Although a particular pacing algorithm does not apply to all of the compute nodes in the network, readers will also note that a particular pacing algorithm does in fact apply to communications between the transmitting node and more than one compute node—the particular pacing algorithm applies to communications between the transmitting node and all of the compute nodes in a particular network region. Applying a pacing algorithm to a group of adjacent nodes is advantageous because often network congestion between a transmitting node and a receiving node is similar to the network congestion between the transmitting node and a node adjacent to the receiving node.

The system of FIG. 1 may also operate generally for pacing network traffic among a plurality of compute nodes connected using a data communications network according to embodiments of the present invention in that the compute node identifying the roundtrip time delays may share the roundtrip time delay identified for each region of the network with the other compute nodes in the same network region as the compute node identifying the roundtrip time delays. Sharing the roundtrip time delays with the other nodes in the same network region may often be useful because such sharing reduces the need for those other nodes in the same region to consume network bandwidth in an effort to determine their own values for the roundtrip time delay. Moreover, because the nodes in each region are adjacent, the roundtrip time delay between two network regions often does not vary greatly regardless of the nodes used from each region to determine the roundtrip time delay.

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations. Although pacing network traffic among a plurality of compute nodes connected using a data communications network according to embodiments of the present invention is described above in terms of an architecture for a parallel computer, readers will note that such an embodiment is for explanation only and not for limitation. In fact, pacing network traffic among a plurality of compute nodes connected using a data communications network according to embodiments of the present invention may be implemented using a variety of computer system architectures, including for example architectures for a stand-alone compute node, a cluster of nodes, a distributed computing system, a grid computing system, and so on.

The arrangement of nodes, networks, and I/O devices making up the exemplary system illustrated in FIG. 1 are for explanation only, not for limitation of the present invention. Data processing systems capable of pacing network traffic among a plurality of compute nodes connected using a data communications network according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of pacing network traffic among a plurality of compute nodes connected using a data communications network according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Pacing network traffic among a plurality of compute nodes connected using a data communications network according to embodiments of the present invention may be generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of pacing network traffic among a plurality of compute nodes connected using a data communications network according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Figure 2:
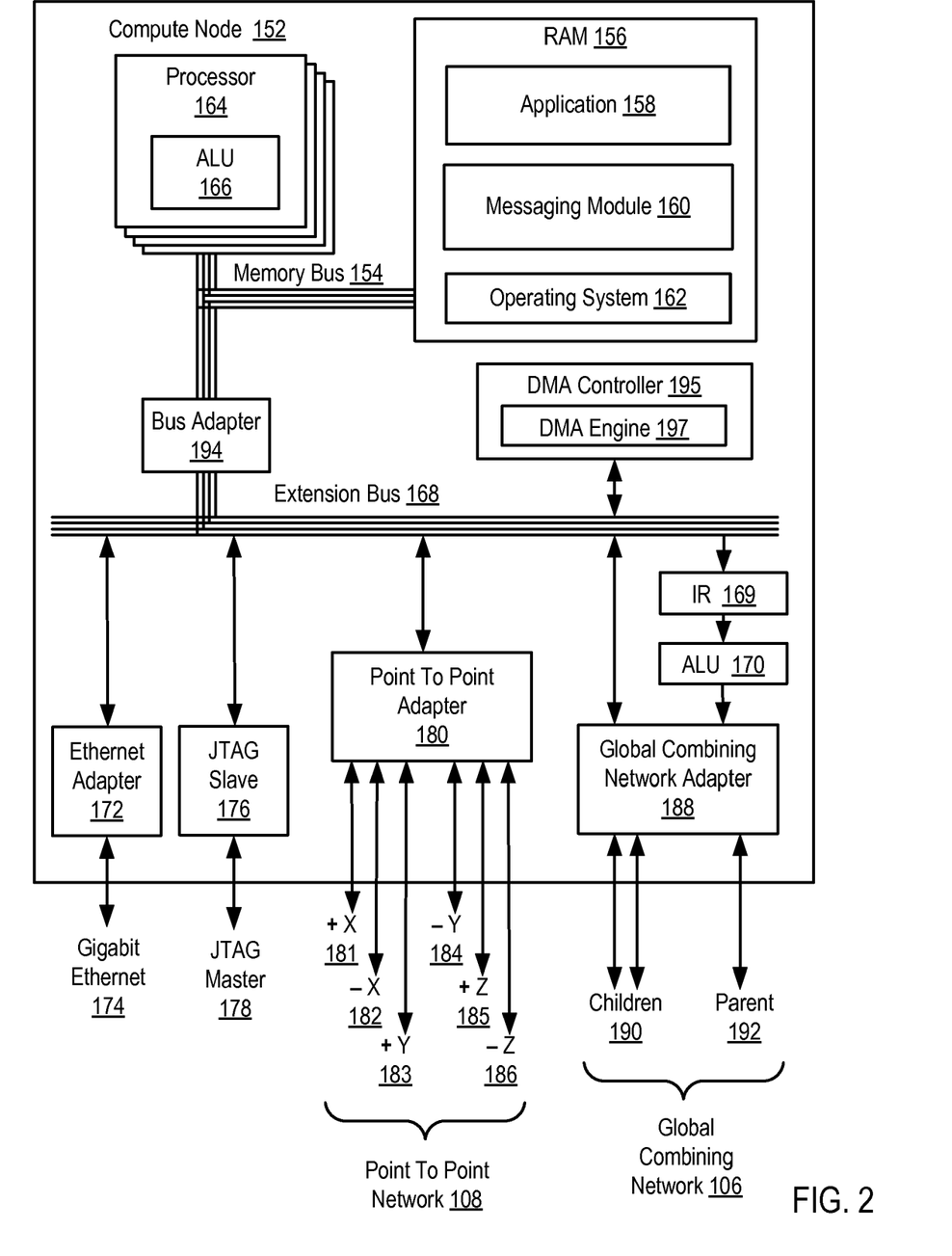
FIG. 2 sets forth a block diagram of an exemplary compute node useful in a parallel computer capable of pacing network traffic among a plurality of compute nodes connected using a data communications network according to embodiments of the present invention.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

The messaging module (160) of FIG. 2 is improved for pacing network traffic among a plurality of compute nodes connected using a data communications network (108) according to embodiments of the present invention. The network (108) has a plurality of network regions, and the plurality of compute nodes distributed among these network regions. The messaging module (160) of FIG. 2 operates generally for pacing network traffic among a plurality of compute nodes connected using a data communications network according to embodiments of the present invention: identifying, by the compute node (152) for each region of the network (108), a roundtrip time delay for communicating with at least one of the compute nodes in that region; determining, by the compute node (152) for each region, a pacing algorithm for that region in dependence upon the roundtrip time delay for that region; and transmitting, by the compute node (152), network packets to at least one of the compute nodes in at least one of the network regions in dependence upon the pacing algorithm for that region. The messaging module (160) of FIG. 2 may also operate generally for pacing network traffic among a plurality of compute nodes connected using a data communications network according to embodiments of the present invention: sharing, by the compute node (152) with the other compute nodes in the same network region as the compute node, the roundtrip time delay identified for each region of the network (108). Although the explanation above describes pacing network traffic among a plurality of compute nodes connected using a data communications network according to embodiments of the present invention being carried out by the messaging module (160), readers will note that some or all of the functionality for pacing network traffic among a plurality of compute nodes connected using a data communications network according to embodiments of the present invention may also be carried out by the DMA controller (195) or other hardware components.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for pacing network traffic among a plurality of compute nodes connected using a data communications network according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in pacing network traffic among a plurality of compute nodes connected using a data communications network according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute the transfer.

Figure 3A:
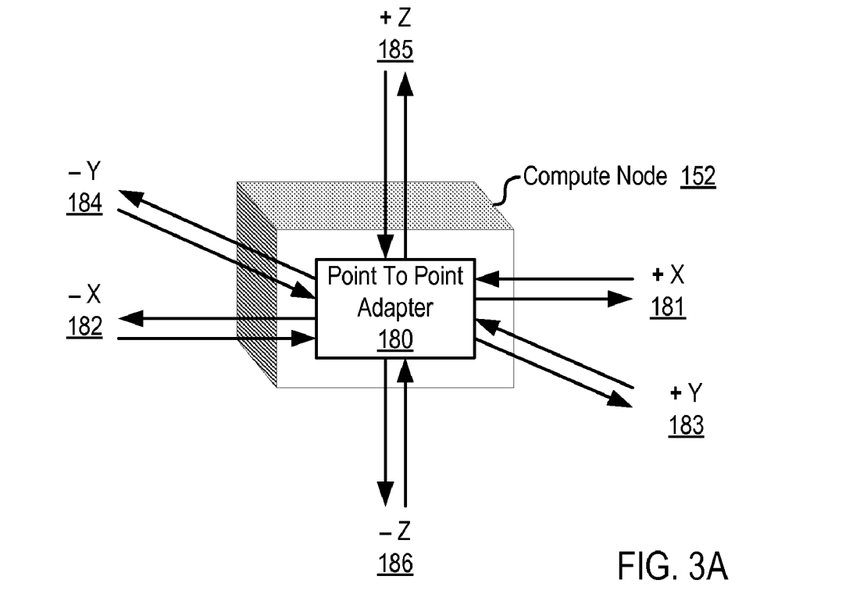
FIG. 3A illustrates an exemplary Point To Point Adapter useful in systems capable of pacing network traffic among a plurality of compute nodes connected using a data communications network according to embodiments of the present invention.

For further explanation, FIG. 3A illustrates an exemplary Point To Point Adapter (180) useful in systems capable of pacing network traffic among a plurality of compute nodes connected using a data communications network according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
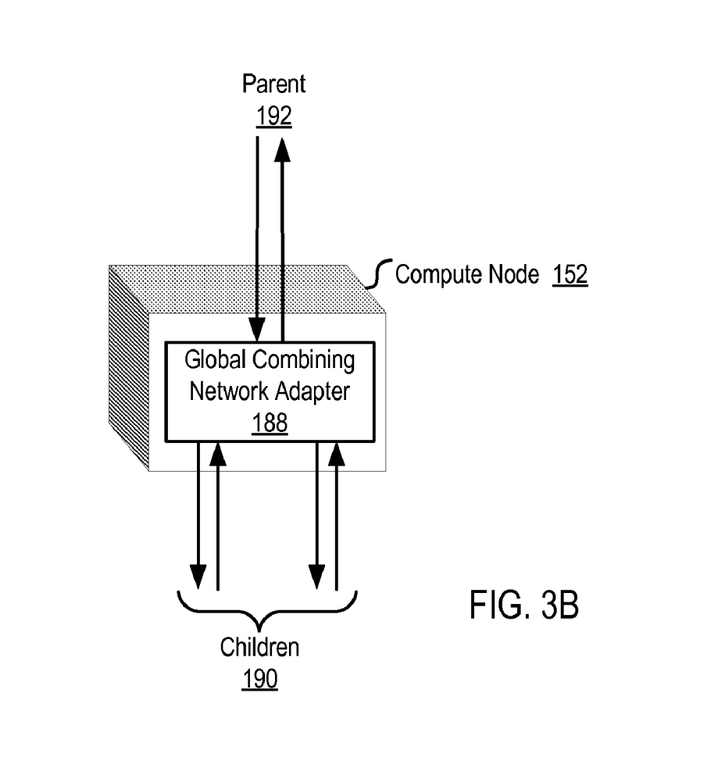
FIG. 3B illustrates an exemplary Global Combining Network Adapter useful in systems capable of pacing network traffic among a plurality of compute nodes connected using a data communications network according to embodiments of the present invention.

For further explanation, FIG. 3B illustrates an exemplary Global Combining Network Adapter (188) useful in systems capable of pacing network traffic among a plurality of compute nodes connected using a data communications network according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
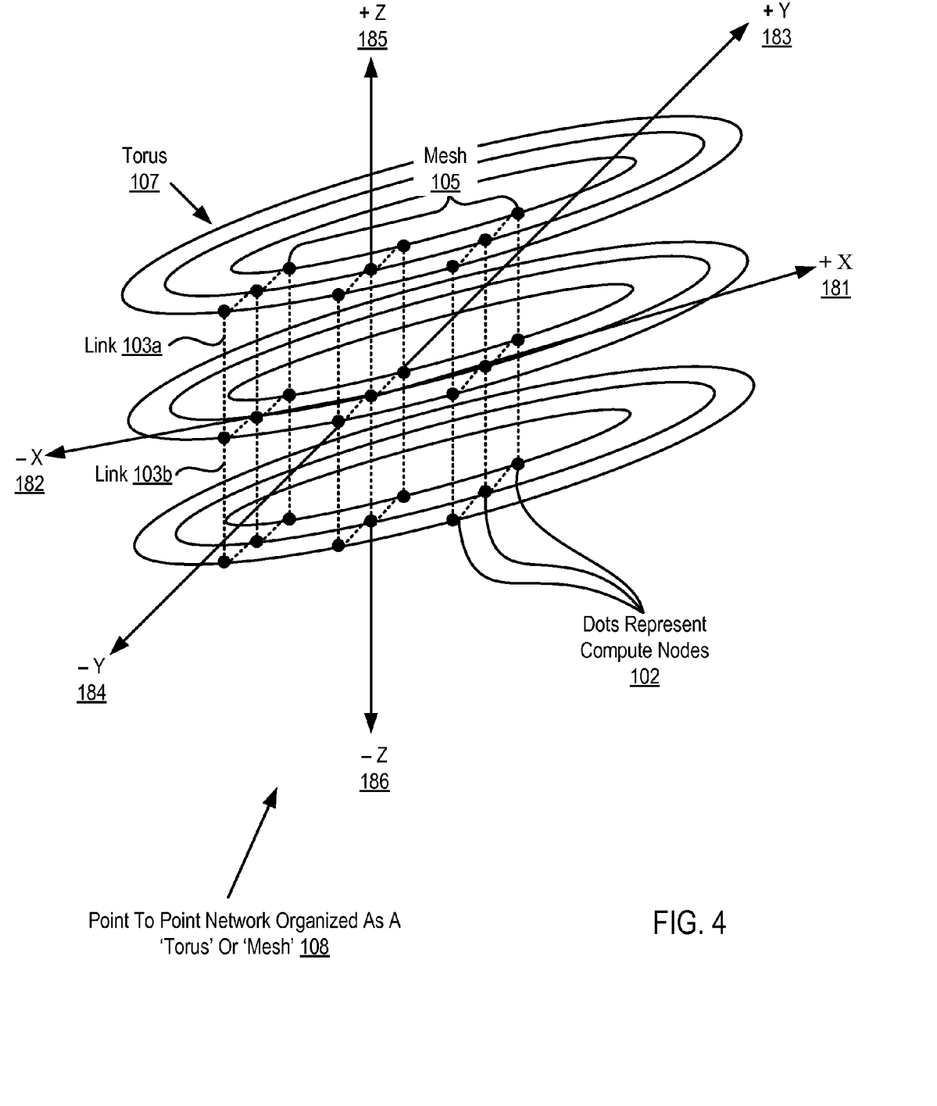
FIG. 4 sets forth a line drawing illustrating an exemplary data communications network optimized for point to point operations useful in systems capable of pacing network traffic among a plurality of compute nodes connected using a data communications network in accordance with embodiments of the present invention.

For further explanation, FIG. 4 sets forth a line drawing illustrating an exemplary data communications network (108) optimized for point to point operations useful in systems capable of pacing network traffic among a plurality of compute nodes connected using a data communications network in accordance with embodiments of the present invention. In the example of FIG. 4, dots represent compute nodes (102) of a parallel computer, and the dotted lines between the dots represent data network links (103) between compute nodes. The networks links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (1 05). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in pacing network traffic among a plurality of compute nodes connected using a data communications network in accordance with embodiments of the present invention may contain only a few compute nodes or may contain thousands of compute nodes.

Figure 5:
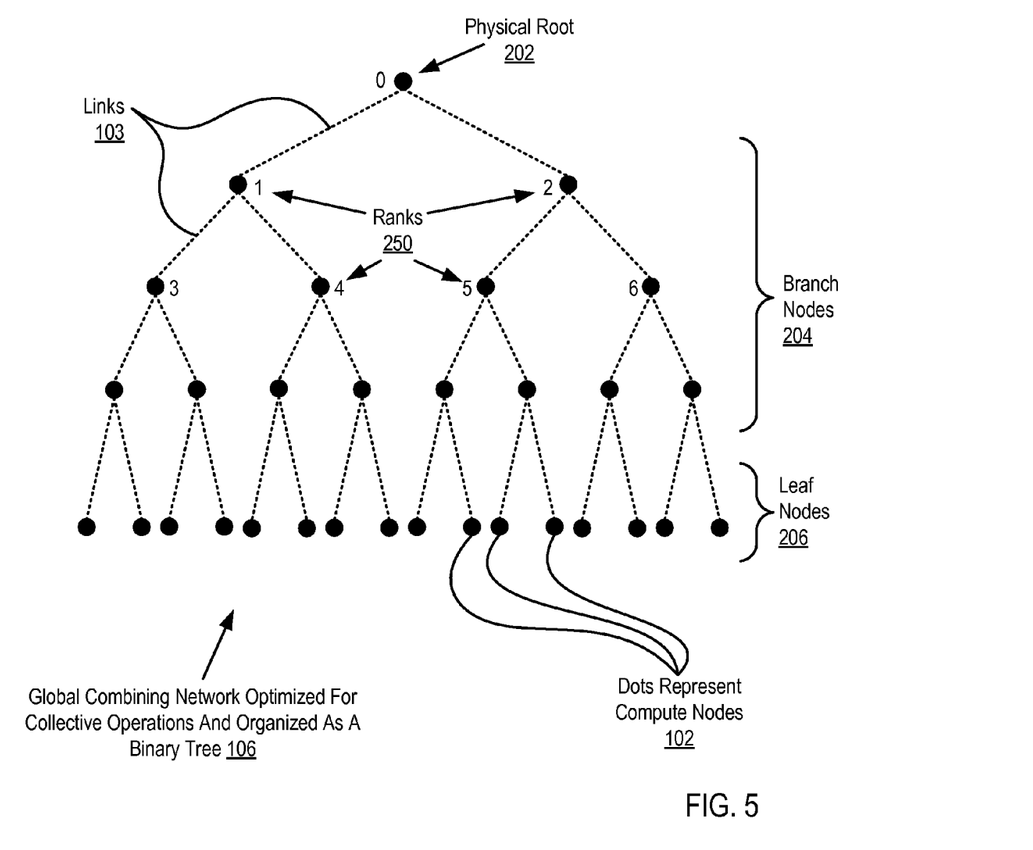
FIG. 5 sets forth a line drawing illustrating an exemplary data communications network optimized for collective operations useful in systems capable of pacing network traffic among a plurality of compute nodes connected using a data communications network in accordance with embodiments of the present invention.

For further explanation, FIG. 5 sets forth a line drawing illustrating an exemplary data communications network (106) optimized for collective operations useful in systems capable of pacing network traffic among a plurality of compute nodes connected using a data communications network in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for pacing network traffic among a plurality of compute nodes connected using a data communications network accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
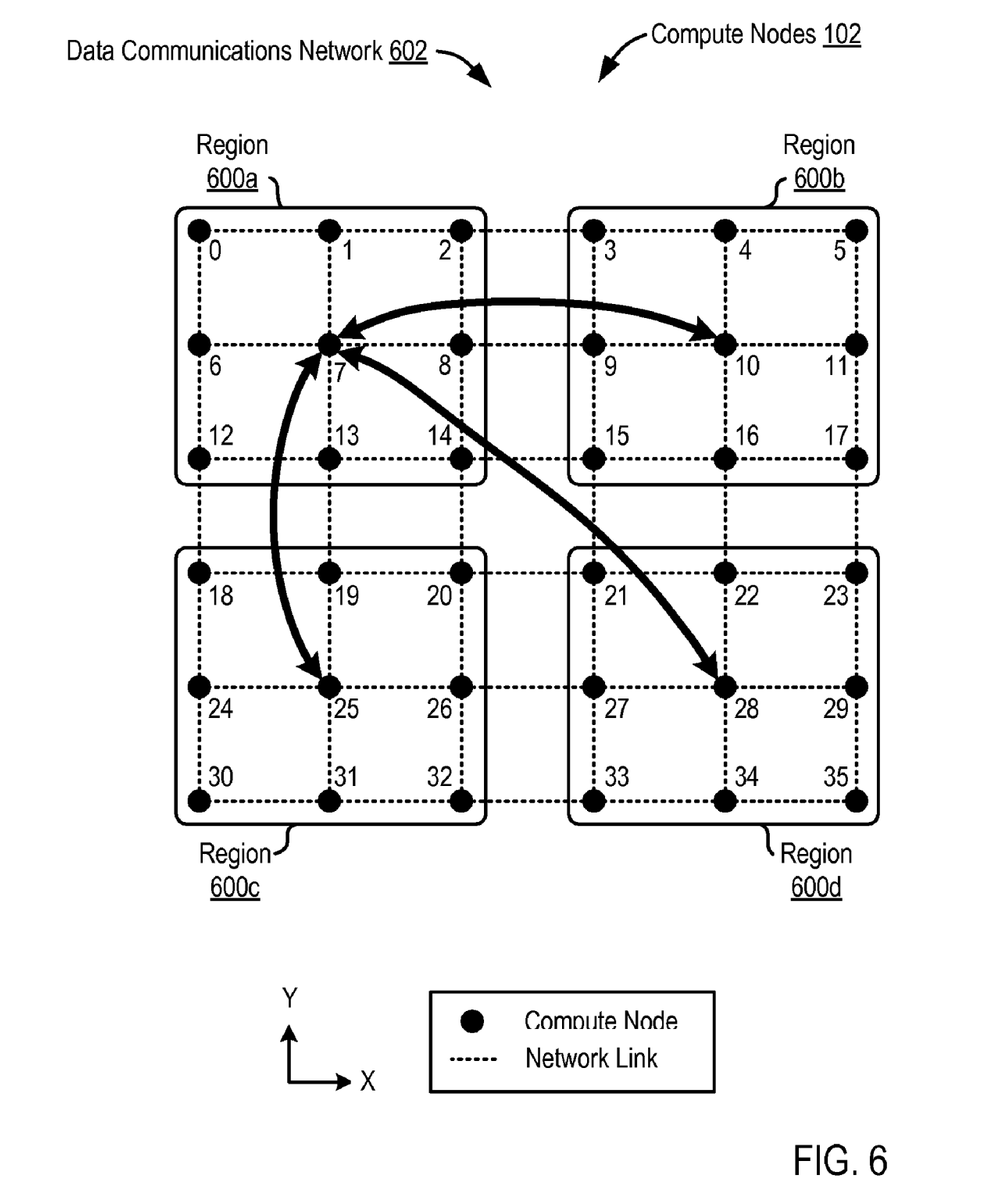
FIG. 6 sets forth a line drawing illustrating an exemplary data communications network useful in systems capable of pacing network traffic among a plurality of compute nodes connected using a data communications network in accordance with embodiments of the present invention.

For further explanation, FIG. 6 sets forth a line drawing illustrating an exemplary data communications network useful in systems capable of pacing network traffic among a plurality of compute nodes connected using a data communications network in accordance with embodiments of the present invention. The compute nodes (102) are number 0-35 and are connected using a data communications network (602). Each compute node (102) of FIG. 6 is connected to adjacent compute nodes in the data communications network (602) through two or more network links.

In the example of FIG. 6, the network (602) has a plurality of network regions (600), and the plurality of compute nodes (102) are distributed among these network regions (602). As mentioned above, a network region is a group of adjacent compute nodes and the corresponding network infrastructure that enables communications among the nodes in the group. The compute nodes are 'adjacent' in the sense that each node in the group is adjacent in network topology to at least one other node in the group. Two compute nodes are adjacent when the compute nodes are capable of communicating directly through a network link without any intervening compute nodes in the data communication path. Network regions may be specified by the nodes included in each region. In the example of FIG. 6, the network has four network regions (600). Network region (600a) includes compute nodes 0, 1, 2, 6, 7, 8, 12, 13, and 14. Network region (600b) includes compute nodes 3, 4, 5, 9, 10, 11, 15, 16, and 17. Network region (600c) includes compute nodes 18, 19, 20, 24, 25, 26, 30, 31, and 32. Network region (600d) of FIG. 6 includes compute nodes 21, 22, 23, 27, 28, 29, 33, 34, and 35.

For an example of pacing network traffic among a plurality of compute nodes connected using a data communications network in accordance with embodiments of the present invention, consider compute node 7 illustrated in FIG. 6. In the example of FIG. 6, compute node 7 identifies for each region (600) of the network (602), a roundtrip time delay for communicating with at least one of the compute nodes in that region. That is, compute node 7 identifies a roundtrip time delay for communicating with compute node 10 in network region (600b), with compute node 25 in network region (600c), and with compute node 28 in network region (600d). Compute node 7's communications with compute nodes 10, 25, and 28 respectively are illustrated in FIG. 6 using double-ended arrows.

Using the roundtrip time delay for each network region (600), compute node 7 determines a pacing algorithm for each network region (600) in dependence upon the roundtrip time delay for that region. A pacing algorithm refers to the manner in which a compute node limits data transmissions to the compute nodes of a particular network region. For example, a pacing algorithm may specify allowing a transmission time delay to elapse between transmissions of a particular number of the network packets. Readers will note that each pacing algorithm applies only to a specific group of compute nodes in a specific network region. In FIG. 6, for example, compute node 7 uses the pacing algorithm determined using the roundtrip time delay with compute node 10 in the communications with all of the compute nodes in network region (600b). Similarly, compute node 7 uses the pacing algorithm determined using the roundtrip time delay with compute node 25 in the communications with all of the compute nodes in network region (600c). In the same manner, compute node 7 uses the pacing algorithm determined using the roundtrip time delay with compute node 28 in the communications with all of the compute nodes in network region (600d). Because the network congestion between region (600a)—the region that includes compute node 7—and the other regions (600b, 600c, 600d) may vary as indicated by the differing roundtrip time delays, the pacing algorithms used by compute node 7 to communicate with nodes in each region (600b, 600c, 600d) may also vary.

In the example of FIG. 6, compute node 7 transmits network packets to at least one of the compute nodes in at least one of the network regions in dependence upon the pacing algorithm for that region. For example, compute node 7 may transmit network packets to compute node 5 of region (600b) using the pacing algorithm determined based on the roundtrip time delay in communicating with compute node 10. Similarly, compute node 7 may transmit network packets to compute node 24 of region (600c) using the pacing algorithm determined based on the roundtrip time delay in communicating with compute node 25. Compute node 7 may also transmit network packets to compute node 33 of region (600d) using the pacing algorithm determined based on the roundtrip time delay in communicating with compute node 28.

Figure 7:
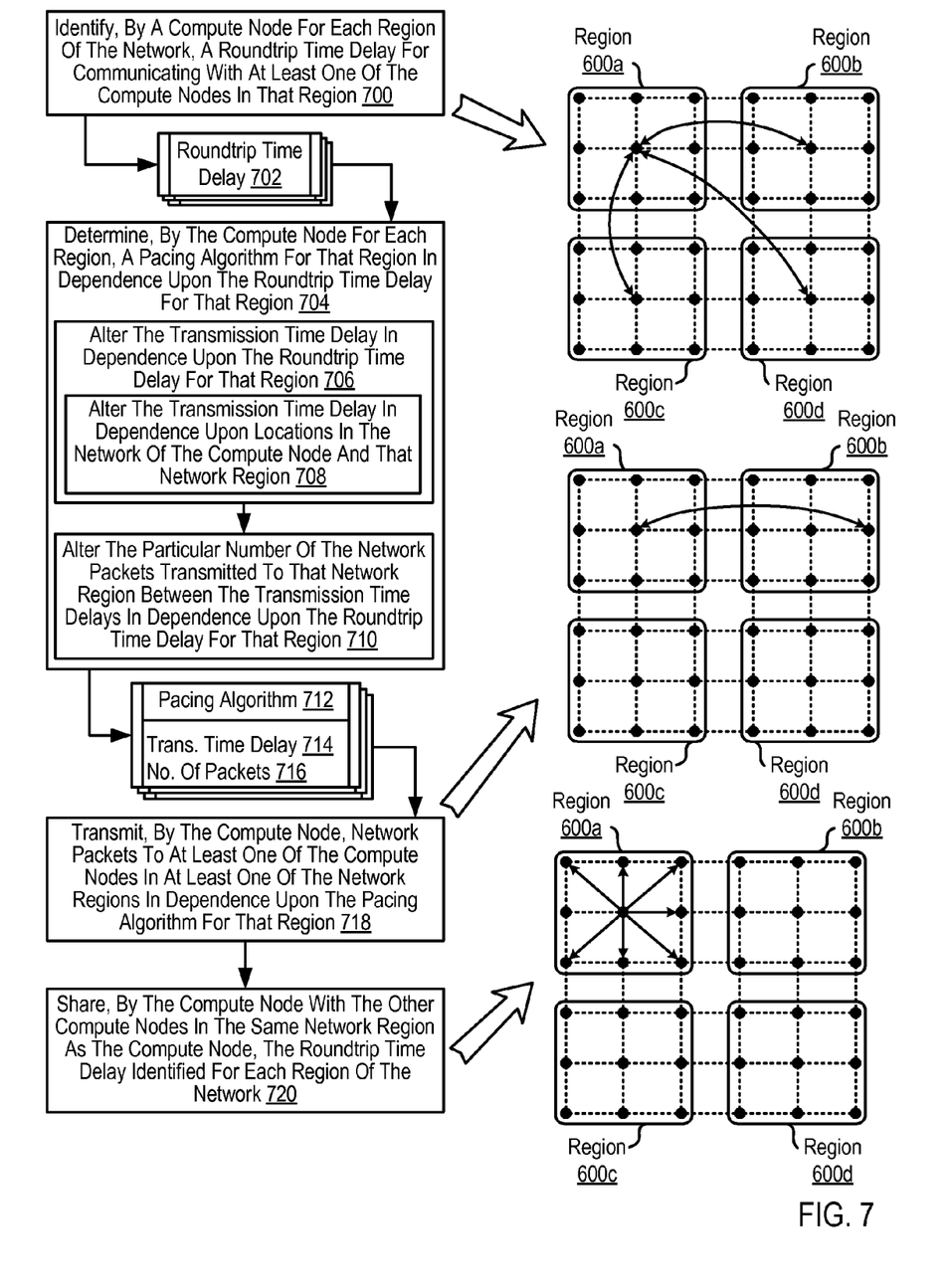
FIG. 7 sets forth a flow chart illustrating an exemplary method for pacing network traffic among a plurality of compute nodes connected using a data communications network according to the present invention.

For further explanation, FIG. 7 sets forth a flow chart illustrating an exemplary method for pacing network traffic among a plurality of compute nodes connected using a data communications network according to the present invention. FIG. 7 illustrates the compute nodes as solid circles and illustrates network links between compute nodes as dotted lines. The network described with reference to FIG. 7 has four network regions (600), and the plurality of compute nodes distributed among these network regions (600).

The method of FIG. 7 includes identifying (700), by a compute node for each region (600) of the network, a roundtrip time delay (702) for communicating with at least one of the compute nodes in that region (600). The roundtrip time delay (702) of FIG. 7 represents a time period beginning when the compute node transmits a network packet to another node in the network and ending when the compute node receives an acknowledgement that the other node received the network packet. A compute node may identify (700), for each region (600) of the network, a roundtrip time delay (702) for communicating with at least one of the compute nodes in that region (600) according to the method of FIG. 7 by selecting a compute node from each network region (600), pinging each selected node, and measuring the elapsed time between pinging each selected node and receiving an acknowledgement of the ping from each selected node.

The method of FIG. 7 includes determining (704), by the compute node for each region (600), a pacing algorithm (712) for that region in dependence upon the roundtrip time delay (702) for that region. Each pacing algorithm (712) of FIG. 7 represents the manner in which a compute node limits data transmissions to the compute nodes of a particular network region. In FIG. 7, each pacing algorithm (712) specifies allowing a transmission time delay (714) to elapse between transmissions of a particular number (716) of the network packets. That is, each pacing algorithm (712) of FIG. 7 instructs the compute node to pause for the transmission time delay (714) after transmitting the number (716) of network packets to compute nodes in the region (600) corresponding to that pacing algorithm (714).

In the method of FIG. 7, the compute node determines (704) the pacing algorithm (712) for each region (600) according to the method of FIG. 7 by altering (706) the transmission time delay (714) specified by the pacing algorithm (712) for that region of the network in dependence upon the roundtrip time delay (702) for that region. The compute node may alter (706) the transmission time delay (714) specified by the pacing algorithm (712) for a region (600) of the network in dependence upon the roundtrip time delay (702) for that region according to the method of FIG. 7 by increasing the transmission time delay (714) as the roundtrip time delay (702) increases or decreasing the transmission time delay (714) as the roundtrip time delay (702) decreases. The relationship between the transmission time delay (714) and the roundtrip time delay (702) could be a linear relationship, exponential relationship, or any other mathematical relationship as will occur to those of skill in the art. For example, as the roundtrip time delay (702) increases between the compute node and a node in a particular network region, the compute node may increase the transmission time delay (714) in the pacing algorithm for that region by some proportional amount.

Altering (706) the transmission time delay (714) specified by the pacing algorithm (712) for a region (600) of the network according to the method of FIG. 7 also includes altering (708) the transmission time delay (714) specified by the pacing algorithm (714) for that region of the network in dependence upon locations in the network of the compute node and that network region. In the method of FIG. 7, the compute node may alter (708) the transmission time delay (714) in dependence upon both the roundtrip time delay (702) for a particular network region (600) and the locations in the network of the compute node and that network region by estimating the ideal roundtrip time for each network region (600) based on the location of each region (600) with respect to the compute node, comparing the roundtrip time delay (702) for each region (600) with the estimated ideal roundtrip time delay (702) for that region, and adjusting the transmission time delay (714) based on the comparison. When the roundtrip time delay (702) for a region (600) is above the estimated ideal roundtrip time delay (702) for that region, then the compute node may increase the transmission time delay (714) in the pacing algorithm in an effort to reduce the network congestion between the compute node and that region. When the roundtrip time delay (702) for a region (600) is below the estimated ideal roundtrip time delay (702) for that region, then the compute node may decrease the transmission time delay (714) in the pacing algorithm in an effort to reduce latency when communicating with node in that region.

In addition to adjusting the transmission time delay (714), the compute node determines (704) the pacing algorithm (712) for each region (600) according to the method of FIG. 7 by altering (710) the particular number (716) of the network packets transmitted to that network region between the transmission time delays (714) in dependence upon the roundtrip time delay (702) for that region of the network. The compute node may alter (710) the particular number (716) of the network packets transmitted to a network region between the transmission time delays (714) according to the method of FIG. 7 by increasing the number (716) of network packets transmitted to that network region between the transmission time delays (714) as the roundtrip time delay (702) for that region decreases. The compute node may also alter (710) the particular number (716) of the network packets transmitted to a network region between the transmission time delays (714) according to the method of FIG. 7 by decreasing the number (716) of network packets transmitted to that network region between the transmission time delays (714) as the roundtrip time delay (702) for that region increases.

The method of FIG. 7 also includes transmitting (718), by the compute node, network packets to at least one of the compute nodes in at least one of the network regions (600) in dependence upon the pacing algorithm (712) for that region. The compute node may transmit (718) network packets to a compute nodes in one of the network regions (600) in dependence upon the pacing algorithm (712) for that region according to the method of FIG. 7 by injecting a packet into the network for transmission to a node in a particular region, incrementing a counter designated for tracking packets transmitted to that region, determining whether the counter value matches the number (716) of network packets specified in the pacing algorithm (712) for that region. The compute node may then inject the next packet into the network for transmission to a node in that particular region if the counter value does not match the number (716) of network packets specified in the pacing algorithm (712) for that region. If the counter value matches the number (716) of network packets specified in the pacing algorithm (712) for that region, the compute node may wait for the time specified by the transmission time delay (714) in the pacing algorithm (712) for that region to elapse before resetting the counter and transmitting the next packet to a node in that region.

The method of FIG. 7 includes sharing (720), by the compute node with the other compute nodes in the same network region (600*a*) as the compute node, the roundtrip time delay (702) identified for each region (600) of the network. The compute node may share (720) the roundtrip time delay (702) for each region (600) with the other compute nodes in the same network region (600*a*) as the compute node according to the method of FIG. 7 by packaging the roundtrip time delays (702) for each of the regions (600) into a single message and broadcasting the message to the other compute node in the same region as the compute node that identified the roundtrip time delays (702). Sharing (720) the roundtrip time delay (702) for each region (600) with the other compute nodes in the same network region (600*a*) as the compute node that identified the roundtrip time delays (702) advantageously allows those compute nodes to determine pacing algorithms without having to flood the network with additional traffic by pinging compute nodes in each of the other regions.

Exemplary embodiments of the present invention are described largely in the context of a fully functional computer system for pacing network traffic among a plurality of compute nodes connected using a data communications network. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of pacing network traffic among a plurality of compute nodes connected using a data communications network, the network having a plurality of network regions, the plurality of compute nodes distributed among these network regions, the method comprising:
   identifying, by a compute node for each region of the network, a roundtrip time delay for communicating with at least one of the compute nodes in that region;
   sharing, by the compute node with all other compute nodes in the same network region as the compute node, the roundtrip time delay identified for each region of the network;
   determining, by the compute node for each region, a pacing algorithm for that region in dependence upon the roundtrip time delay for that region; and
   transmitting, by the compute node, network packets to at least one of the compute nodes in at least one of the network regions in dependence upon the pacing algorithm for that region.

2. The method of claim 1 wherein:
   each pacing algorithm specifies allowing a transmission time delay to elapse between transmissions of a particular number of the network packets; and
   determining, by the compute node for each region, a pacing algorithm for that region in dependence upon the roundtrip time delay for that region further comprises altering the transmission time delay specified by the pacing algorithm for that region of the network in dependence upon the roundtrip time delay for that region.

3. The method of claim 2 wherein altering the transmission time delay specified by the pacing algorithm for that region of the network in dependence upon the roundtrip time delay for that region further comprises altering the transmission time delay specified by the pacing algorithm for that region of the network in dependence upon locations in the network of the compute node and that network region.

4. The method of claim 1 wherein:
   each pacing algorithm specifies allowing a transmission time delay to elapse between transmissions of a particular number of the network packets; and
   determining, by the compute node for each region, a pacing algorithm for that region in dependence upon the roundtrip time delay for that region further comprises altering the particular number of the network packets transmitted to that network region between the transmission time delays in dependence upon the roundtrip time delay for that region of the network.

5. The method of claim 1 wherein pacing network traffic among a plurality of compute nodes connected using a data communications network further comprises pacing network traffic among a plurality of compute nodes of a parallel computer, the plurality of compute nodes connected together using a plurality of data communications networks, at least one of the data communications networks optimized for point to point operations, and at least one of the data communications networks optimized for collective operations.

6. A compute node capable of pacing network traffic among a plurality of compute nodes connected using a data communications network, the network having a plurality of network regions, the plurality of compute nodes distributed among these network regions, the compute node comprising one or more computer processors and computer memory operatively coupled to the computer processors, the computer memory having disposed within it computer program instructions capable of:
   identifying, for each region of the network, a roundtrip time delay for communicating with at least one of the compute nodes in that region;
   sharing, by the compute node with all other compute nodes in the same network region as the compute node, the roundtrip time delay identified for each region of the network;
   determining, for each region, a pacing algorithm for that region in dependence upon the roundtrip time delay for that region; and
   transmitting network packets to at least one of the compute nodes in at least one of the network regions in dependence upon the pacing algorithm for that region.

7. The compute node of claim 6 wherein:
   each pacing algorithm specifies allowing a transmission time delay to elapse between transmissions of a particular number of the network packets; and
   determining, for each region, a pacing algorithm for that region in dependence upon the roundtrip time delay for that region further comprises altering the transmission time delay specified by the pacing algorithm for that region of the network in dependence upon the roundtrip time delay for that region.

8. The compute node of claim 7 wherein altering the transmission time delay specified by the pacing algorithm for that region of the network in dependence upon the roundtrip time delay for that region further comprises altering the transmission time delay specified by the pacing algorithm for that region of the network in dependence upon locations in the network of the compute node and that network region.

9. The compute node of claim 6 wherein:
   each pacing algorithm specifies allowing a transmission time delay to elapse between transmissions of a particular number of the network packets; and
   determining, for each region, a pacing algorithm for that region in dependence upon the roundtrip time delay for that region further comprises altering the particular number of the network packets transmitted to that network region between the transmission time delays in dependence upon the roundtrip time delay for that region of the network.

10. The compute node of claim 6 wherein pacing network traffic among a plurality of compute nodes connected using a data communications network further comprises pacing network traffic among a plurality of compute nodes of a parallel computer, the plurality of compute nodes connected together using a plurality of data communications networks, at least one of the data communications networks optimized for point to point operations, and at least one of the data communications networks optimized for collective operations.

11. A computer program product for pacing network traffic among a plurality of compute nodes connected using a data communications network, the network having a plurality of network regions, the plurality of compute nodes distributed among these network regions, the computer program product embodied upon a non-transmission computer readable medium, the computer program product comprising computer program instructions capable of:

identifying, by a compute node for each region of the network, a roundtrip time delay for communicating with at least one of the compute nodes in that region;

sharing, by the compute node with all other compute nodes in the same network region as the compute node, the roundtrip time delay identified for each region of the network;

determining, by the compute node for each region, a pacing algorithm for that region in dependence upon the roundtrip time delay for that region; and transmitting, by the compute node, network packets to at least one of the compute nodes in at least one of the network regions in dependence upon the pacing algorithm for that region.

12. The computer program product of claim 11 wherein:

each pacing algorithm specifies allowing a transmission time delay to elapse between transmissions of a particular number of the network packets; and determining, by the compute node for each region, a pacing algorithm for that region in dependence upon the roundtrip time delay for that region further comprises altering the transmission time delay specified by the pacing algorithm for that region of the network in dependence upon the roundtrip time delay for that region.

13. The computer program product of claim 12 wherein altering the transmission time delay specified by the pacing algorithm for that region of the network in dependence upon the roundtrip time delay for that region further comprises altering the transmission time delay specified by the pacing algorithm for that region of the network in dependence upon locations in the network of the compute node and that network region.

14. The computer program product of claim 11 wherein:

each pacing algorithm specifies allowing a transmission time delay to elapse between transmissions of a particular number of the network packets; and determining, by the compute node for each region, a pacing algorithm for that region in dependence upon the roundtrip time delay for that region further comprises altering the particular number of the network packets transmitted to that network region between the transmission time delays in dependence upon the roundtrip time delay for that region of the network.

15. The computer program product of claim 11 wherein pacing network traffic among a plurality of compute nodes connected using a data communications network further comprises pacing network traffic among a plurality of compute nodes of a parallel computer, the plurality of compute nodes connected together using a plurality of data communications networks, at least one of the data communications networks optimized for point to point operations, and at least one of the data communications networks optimized for collective operations.

* * * * *